Oct. 31, 1939.    C. E. GILL    2,178,519
BYPASS ODORIZER
Filed June 19, 1937

INVENTOR.
Charles E. Gill
BY Maurice A. Crews
ATTORNEY.

Patented Oct. 31, 1939

2,178,519

UNITED STATES PATENT OFFICE 2,178,519

BYPASS ODORIZER

Charles E. Gill, River Forest, Ill., assignor to The Sharples Solvents Corporation, Philadelphia, Pa.

Application June 19, 1937, Serial No. 149,061

9 Claims. (Cl. 261—119)

The present invention pertains to the absorption of vapors in desired proportions in a flowing stream of gas. It was conceived as a solution of problems arising incident to the absorption of odorizing liquid in a flowing stream of natural gas, but its general field of application is broader than this specific problem.

For the sake of convenience, the invention will be described in reference to the problem of odorizing gas. The object of the invention is to introduce the vapors of the odorizing material into the flowing gas stream in predetermined desired ratio regardless of substantial variations in the pressure of the gas to be odorized at the point of odorization.

Figure 1:
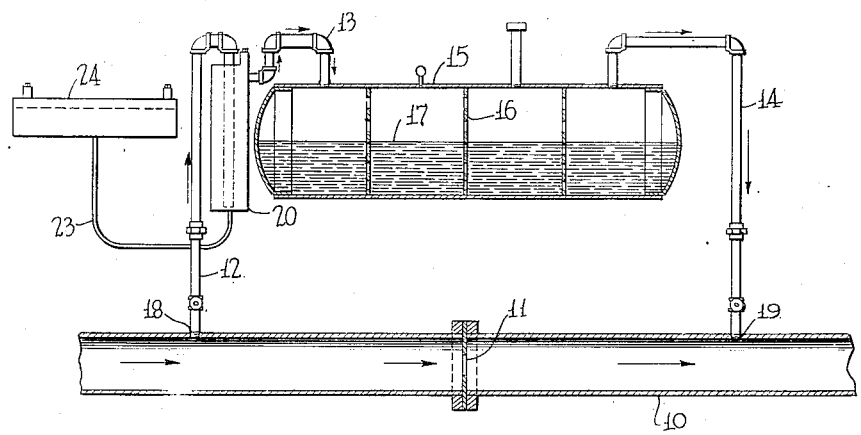
Figure 2:
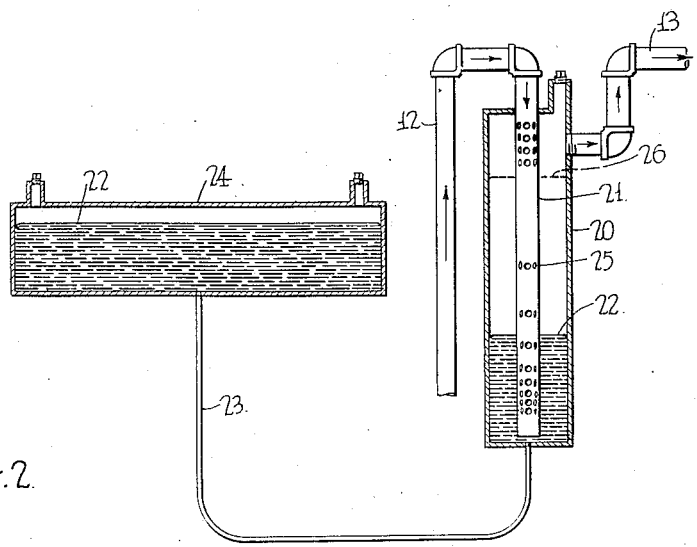

The invention will be best understood by reference to the attached drawing in which, Figure 1 illustrates a cross section of a gas main through which the gas to be odorized flows and to which the odorizing equipment of the invention is attached as illustrated, and Figure 2 is a detailed cross section illustrating the application of the present invention to problems encountered in the use of equipment of the general type illustrated in Figure 1.

Referring to the drawing by reference characters, a gas main 10 which is the principal conduit for the gas to be odorized is provided with an orifice plate 11. The section of the gas main which contains the orifice plate is bypassed by conduits 12, 13 and 14 and a tank 15 containing the odorizing liquid. The tank 15 may be provided with suitable baffles as indicated at 16 to insure adequate contact between the gas flowing through that tank and the odorizing liquid.

In a system including the features thus far described, the ratio of gas flowing through the main 10 across the orifice plate 11 to the gas bypassed around that orifice plate through the elements 12, 13, 14 and 15 discussed above is constant regardless of variations in flow, this ratio being determined by the size of the orifice in the plate 11 and the relative resistance in the main 10 and the bypass line. In view of the fact that the ratio of the gas flowing in the main conduit to the gas flowing through the bypass conduit is constant, the desired proportion of odorant will be introduced into the gas flowing in the main conduit by absorption from the body of liquid 17 in the container 15 as long as the pressure at the point 18 of the beginning of the bypass line remains substantially constant.

If the absolute static pressure at the point 18 varies materially, however, as is the case at times of maximum gas consumption in some gas distribution systems, a problem arises which is independent of the question of the relative volumes of gas flowing through the main 10 and the bypass conduit respectively. The nature of this problem can be understood from the following explanation. Assuming that the gas reaching the point 18 is always at the same pressure and that that gas is saturated with the vapor of the odorizing material as it leaves the container 15, the ratio of odorizing material to gas returned to the main at the point 19 will always be the same. If, however, the pressure at the point 18 is materially increased, the pressure of the gas flowing through the container 15 and the pressure of the gas reaching the point 19 will be correspondingly increased, and the gas passing through the container 15 will be under a higher state of compression than would be the case if the pressure were lower at the point 18. But the number of molecules of odorizing material within the vapor space above the liquid level 17 in the container 15 is the same regardless of the pressure above the liquid level caused by the flow of gas from the point 18 into the container 15 and through that container. The ratio of the number of molecules of vapor absorbed in the bypass system to the number of molecules of gas to be odorized is accordingly decreased in proportion to the increase in pressure at the point 18.

In accordance with the present invention special provision is made for the correction of the difficulty described in the last paragraph and for obtaining a substantially uniform degree of absorption of vapor of odorizing material in the gas regardless of variations in pressure. To this end, means are provided for an increase in the ratio of gas bypassed through elements 12, 13, 14 and 15 to gas flowing through the main 10 when the pressure in the main 10 increases. By increasing the proportion of gas bypassed through the odorizing container at least roughly in proportion to the increase in pressure at the point 18, the proportion of odorizing material reaching the end point 19 of the bypass conduit will bear a substantially constant ratio to the amount of gas reaching that point through the main 10 and the bypass conduit.

The manner in which the results of the present invention are attained will be best understood by reference to Figure 2 of the drawing. Gas passing through conduit 12 is delivered into a container 20 through an inlet tube 21 whose lower end is immersed in a body of liquid (e. g., mercury) 22 in the lower part of the container 20. The lower part of the container 20 is connected through a tube 23 with a container 24 which serves as a source of the liquid 22 and a compression chamber. The tube 21 is provided with a plurality of spaced perforations 25 which are selectively immersed within the liquid 22. The arrangement of the perforations 25 will depend upon the particular pressures and range of pressures which are intended to prevail at the point 18 in the use of the gas distribution system, and the principles underlying the design of this feature of the equipment will be evident from the following discussion of its operation. The level of the liquid 22 in the container 20 will depend upon the pressure of the gas flowing into the container 20. In case the pressure is low, the level of the liquid 22 in the container 20 will rise due to the hydrostatic head of the liquid in the container 24 and the pressure of the gas above the liquid in that container. At atmospheric pressure the level of the liquid 22 may attain a height in the container 20 indicated by the dotted line 26. As the pressure of the gas in the container 20 increases by reason of the increase of the pressure at point 18, the liquid level 22 will be depressed, and the amount of such depression will be a function of the increase in pressure at the point 18. Thus, as the pressure of the gas at the point 18 increases, a progressively larger number of openings 25 in the tube 21 will be uncovered and the resistance to flow of the gas from the tube 21 will be correspondingly decreased. As a consequence of this fact, a larger proportion of the gas reaching the point 18 will be bypassed when that gas has a high pressure than will be bypassed when it has a low pressure. Thus, while the gas passing through the container 15 will contain a lower molecular concentration of the odorizing material as it leaves that container, at high pressures than it contains at low pressures, the proportion of odorizing material to the total gas flow past the point 18 will be the same at high pressures as at low pressures because of the fact that the special process and equipment discussed above causes a larger proportion of the gas being odorized to be bypassed through the odorizing equipment at high pressures than at low pressures.

Modifications will be obvious to those skilled in the art and I do not, therefore, wish to be limited except by the subjoined claims.

I claim:

1. In apparatus for absorbing a vapor in a flowing stream of gas, a gas main, a normally open bypass conduit designed to bypass a part of the gas flowing through said main and return said gas to said main, a source of liquid to be absorbed in said bypass conduit and means for increasing the ratio of gas bypassed to gas flowing through the main upon increase of pressure of said gas in the bypass conduit.

2. In apparatus for absorbing a vapor in a flowing stream of gas, a gas main, a normally open bypass conduit designed to bypass a part of the gas flowing through said main and return said gas to said main, a source of liquid to be absorbed in said bypass conduit and means for decreasing the resistance of said bypass conduit to flow of gas therethrough upon increase of pressure of said gas in the bypass conduit.

3. In apparatus for absorbing a vapor in a flowing stream of gas, a gas main, a normally open bypass conduit designed to bypass a part of the gas flowing through said main and return said gas to said main, said bypass conduit including a container adapted to contain a supply of liquid to be absorbed across which said gas is adapted to flow and means for increasing the ratio of gas bypassed to gas flowing through the main upon increase of pressure of said gas in the bypass conduit.

4. In apparatus for absorbing a vapor in a flowing stream of gas, a gas main, a normally open bypass conduit designed to bypass a part of the gas flowing through said main and return said gas to said main, a source of liquid to be absorbed in said bypass conduit and means for increasing the resistance of said bypass conduit to flow of gas therethrough upon decrease of pressure of said gas in the bypass conduit.

5. In apparatus for absorbing a vapor in a flowing stream of gas, a gas main, a normally open bypass conduit designed to bypass a part of the gas flowing through said main and return said gas to said main, a source of liquid to be absorbed in said bypass conduit, a flow-restricting member forming a part of said bypass conduit and means for varying the effectiveness of said flow-restricting member in inverse relationship to the pressure of said gas in the bypass conduit.

6. In apparatus for absorbing a vapor in a flowing stream of gas, a gas main, a normally open bypass conduit designed to bypass a part of the gas flowing through said main and return said gas to said main, a source of liquid to be absorbed in said bypass conduit, a perforated flow-restricting member forming a part of said bypass conduit and means for varying the effectiveness of said flow-restricting member in inverse relationship to the pressure of said gas in the bypass conduit.

7. In apparatus for absorbing a vapor in a flowing stream of gas, a gas main, a normally open bypass conduit designed to bypass a part of the gas flowing through said main and return said gas to said main, a source of liquid to be absorbed in said bypass conduit, flow-restricting means forming a part of said bypass conduit, said flow-restricting means comprising a tube having its lower end immersed in a body of liquid, said tube being provided with longitudinally spaced perforations designed to be selectively immersed in said body of liquid depending upon the depth of that body of liquid, and pressure means for varying the depth of the body of liquid in response to changes in the pressure of said gas in the bypass conduit.

8. In apparatus for absorbing a vapor in a flowing stream of gas, a gas main, a normally open bypass conduit designed to bypass a part of the gas flowing through said main and return said gas to said main, a source of liquid to be absorbed in said bypass conduit, a flow-restricting member forming a part of said bypass conduit, said flow-restricting member being provided with a plurality of perforations designed selectively to permit the flow of gas therethrough, and means for increasing the number of said perforations operative, to cause an increase in the proportion of gas bypassed therethrough when the pressure of said gas in the bypass conduit is increased.

9. In apparatus for absorbing a vapor in a flowing stream of gas, a gas main, a normally open bypass conduit designed to bypass a part of the gas flowing through said main and return said gas to said main, a source of liquid to be absorbed in said bypass conduit, said flow-restricting means comprising a tube having its lower end immersed in a body of liquid, said tube being provided with longitudinally spaced perforations designed to be selectively immersed in said body of liquid depending upon the depth of that body of liquid, and a U tube interconnecting said body of liquid with a second body of liquid, whereby to vary the depth of the body of liquid in which a part of said tube is immersed in response to changes in the pressure of said gas in the bypass conduit.

CHARLES E. GILL.